United States Patent [19]
Mourier

[11] 3,931,739
[45] Jan. 13, 1976

[54] NEGATIVE PRESSURE DETECTOR

[75] Inventor: Jean Mourier, Savigny-sur-Orge, France

[73] Assignee: Benson, Creteil Val-de-Marne, France

[22] Filed: Aug. 13, 1974

[21] Appl. No.: 495,892

[52] U.S. Cl.................................. 73/398 C; 73/403
[51] Int. Cl.².......................................... G01L 9/12
[58] Field of Search............ 73/398 C, 403; 317/246

[56] References Cited
UNITED STATES PATENTS 3,134,262   5/1964   Dworzan et al.................. 73/398 C

*Primary Examiner*—Donald O. Woodiel
*Attorney, Agent, or Firm*—Karl W. Flocks

[57] ABSTRACT

The invention relates to a negative pressure or depression detector characterized in that it includes a floating element which forms at once a detecting element and the movable disc or plate of an air capacitor.

The floating element is placed inside a chamber having its lower end vented and its upper end communicating with the depression source, the fixed plate of the capacitor being located at the lower end of the chamber without interfering with the venting.

5 Claims, 3 Drawing Figures

NEGATIVE PRESSURE DETECTOR

Already known are negative pressure of depression detectors in which the detecting element consists for instance of a deformable element such as an elastic membrane whose movements are translated into electrical signals.

Particularly well-known is the kind of pressure detector in which sensitive membrane displaces the movable disc or plate of a capacitor that delivers a voltage proportional to the deflection of the membrane, which deflection in turn depends on the pressure to which the mebrane is subjected.

The present invention relates to a negative pressure of depression detector characterized in that it includes a floating element which forms at once a detecting element and the movable disc or plate of an air capacitor.

The floating element is placed inside a chamber having its lower end vented and its upper end communicating with the depression source, the fixed plate of the capacitor being located at the lower end of the chamber without interfering with the venting.

In one form of embodiment, the chamber is vertical and, with the leakage rate constant, the detector functions in the on-off control mode.

In an alternative embodiment, the chamber tapers downwardly, thereby providing a variable leakage section between the floating element and the chamber wall and causing a voltage proportional to the position of the floating element to be delivered.

In one form of embodiment, the floating element is devoid of any connection with other components of the detector and of any electrical connections, the two capacitor conductors being provided on the fixed capacitor plate, and a movable capacitor plate associated to the floating element being coated with an insulating film which contacts the fixed plate when the floating element is in its inoperative position.

The description which follows with reference to the accompanying non-limitative exemplary drawing will give a clear understanding of how the invention can be carried into practise.

Figure 1:
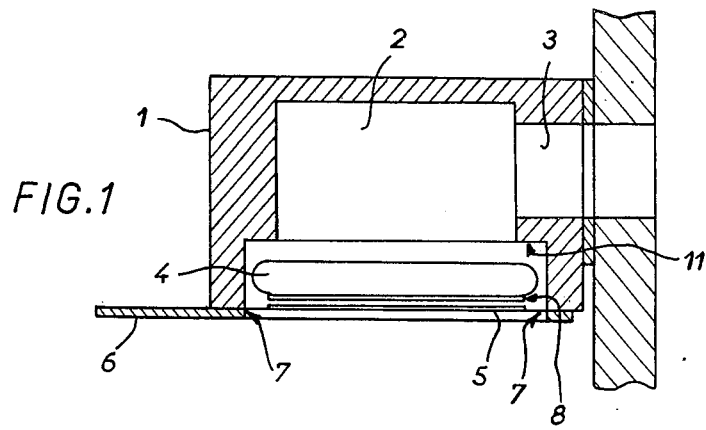
FIG. 1 is a vertical sectional view of a depression detector according to the invention.
Figure 2:
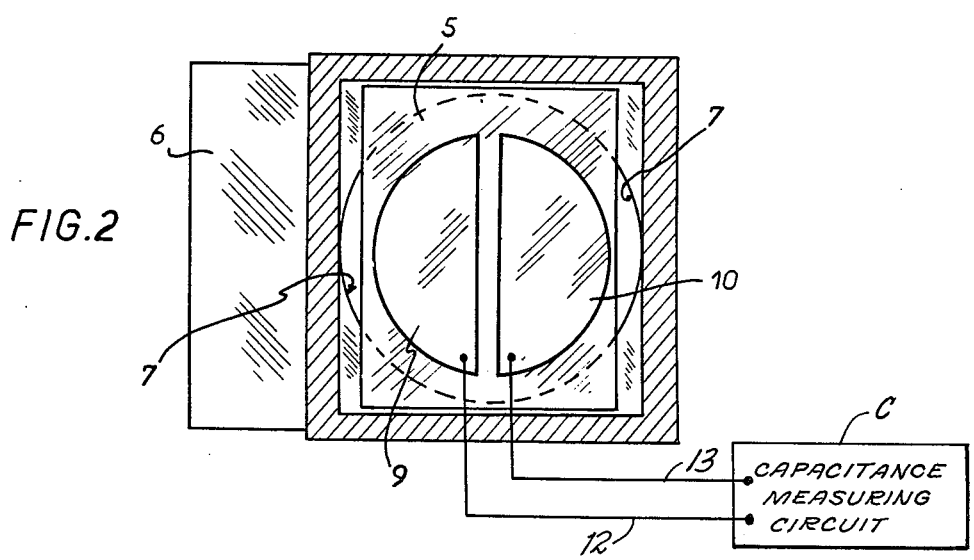
FIG. 2 is a horizontal section taken through the lower end of the depression detector.
Figure 3:
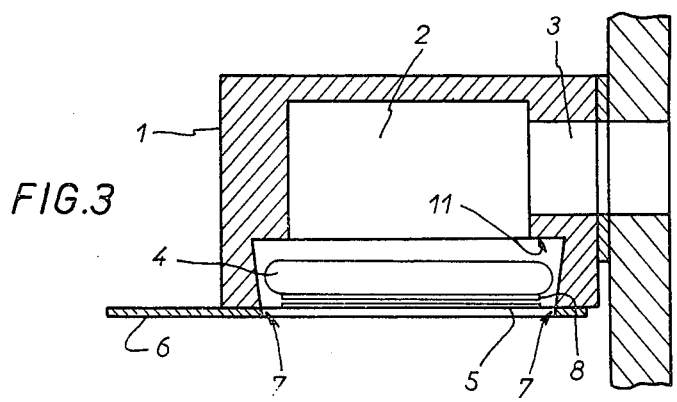
FIG. 3 is a vertical section taken through an alternative embodiment.

In the form of embodiment illustrated in FIGS. 1 and 2, a depression detector according to this invention includes a case 1 and, inside the same, a chamber 2 open at its lower end and having its upper end communicating with a depression or negative-pressure generating source via a duct 3.

A floating element 4 is so arranged within chamber 2 as to cause it, when at rest, to bear against a plate 5 which is itself restrained by a base 6 having the lower chamber opening 7 formed therein. The dimensions of plate 5 are such that a vent is provided between the contour of the plate and that of the opening.

Floating element 4 is formed by a piston made of a light material. Its bottom face is metallized and then coated with an insulating film 8.

Plate 5 is a printed-circuit board having two separate conductor elements 9 and 10.

The conductors 9 and 10 are connected by leads 12 and 13 to a conventional circuit C which measures capacitance.

Since the float 4 will tend to strike plate 5 it is therefore desirable to provide float 4 with the insulating coating 8.

Displacement of the float 4 toward the stationary plate 5 will cause a change in the capacitance between the conductors 9 and 10. Therefore measurement of the capacitance will provide a measurement of the negative pressure.

When a negative pressure (depression) prevails, floating element 4 is sucked upwardly and abuts against an internal shoulder 11 formed in chamber 2, whereby the capacitance of the air capacitor consisting of floating element 4 and plate 5 changes. Such detector operates in the on-off mode, the leakage rate between the floating element and the vertical chamber being constant.

In the alternative embodiment shown in FIG. 5, the chamber tapers downwardly (as in the case of a frustoconical chamber) whereby the leakage section between floating element 4 and the chamber wall varies with the upward or downward displacement of the floating element. The capacitor accordingly delivers a voltage proportional to the position of the floating element, which in turn depends on the depression.

The output signal can be used either directly or through the agency of a transducer.

It goes without saying that changes and substitutions may be made in the preferred exemplary embodiment described herein without departing from the scope of the invention as set forth in the appended claims.

I claim:

1. A negative detector comprising an element floating in air which forms at the same time a detection element and the moving plate or disc of an air capacitor, a chamber having its lower end vented and its upper end communicating with a negative pressure source, a fixed disc or plate of said capacitor being located at the lower end of said chamber and said floating element being contained in said chamber and providing a leakage section between said floating element and a chamber wall.

2. A detector according to claim 1, characterized in that the chamber is vertical and the vented leakage rate constant, whereby said detector operates in the on-off mode.

3. A detector according to claim 1, characterized in that the chamber tapers downwardly, thereby to provide a variable leakage section between the floating element and the chamber wall and delivery of a voltage proportional to the position of said floating element.

4. A detector according to claim 1, characterized in that the floating element is devoid of any connection with other components of the detector and of any electrical connections, the two electrical conductors of the capacitor being provided on the fixed plate or disc thereof and the movable capacitor disc or plate associated to said floating element being coated with an insulating film which contacts the fixed capacitor or plate when the floating element is at rest.

5. A detector according to claim 1, characterized in that the floating element is made of a light material and its bottom face is metallized and then coated with an insulating film.

* * * * *